US009457409B2

(12) United States Patent
Zeeb et al.

(10) Patent No.: US 9,457,409 B2
(45) Date of Patent: Oct. 4, 2016

(54) INDEXABLE CUTTING INSERT AND INDEXABLE CUTTING INSERT HOLDER

(75) Inventors: Rudi Zeeb, Tubingen (DE); Christian Bandura, Karlsruhe (DE)

(73) Assignee: Walter AG, Tübingen (DE)

( * ) Notice: Subject to any disclaimer, the term of this patent is extended or adjusted under 35 U.S.C. 154(b) by 78 days.

(21) Appl. No.: 13/985,492

(22) PCT Filed: Mar. 30, 2012

(86) PCT No.: PCT/EP2012/055884
§ 371 (c)(1),
(2), (4) Date: Oct. 11, 2013

(87) PCT Pub. No.: WO2012/136600
PCT Pub. Date: Oct. 11, 2012

(65) Prior Publication Data
US 2014/0050542 A1 Feb. 20, 2014

(30) Foreign Application Priority Data

Apr. 8, 2011 (DE) .................. 10 2011 007 076

(51) Int. Cl.
B23B 27/04 (2006.01)
B23B 27/16 (2006.01)
B23B 27/08 (2006.01)

(52) U.S. Cl.
CPC ............ B23B 27/164 (2013.01); B23B 27/04 (2013.01); B23B 27/08 (2013.01);
(Continued)

(58) Field of Classification Search
CPC ............... B23B 2200/3627; B23B 2200/369; B23B 2205/12; B23B 27/08; B23B 2200/048; B23B 27/04; B23B 27/164
USPC ......... 407/101, 103, 107, 104, 114–117, 113
See application file for complete search history.

(56) References Cited

U.S. PATENT DOCUMENTS 4,360,297 A 11/1982 Weber
4,632,607 A * 12/1986 Pantzar .................. B23C 5/202
407/113

(Continued)

FOREIGN PATENT DOCUMENTS

DE 2 130 814 6/1971
EP 1 136 158 9/2001
(Continued)

OTHER PUBLICATIONS

Written Opinion for International Patent Application No. PCT/EP2012/055884, dated Oct. 8, 2013.
(Continued)

Primary Examiner — Sara Addisu
(74) Attorney, Agent, or Firm — Morgan, Lewis & Bockius LLP

(57) ABSTRACT

Indexable cutting insert with a plate-like main body having two parallel main surfaces and a peripheral surface connecting the two main surfaces and with a plurality of sections angled with respect to one another, wherein four cutting edges that extend transversely to the main surfaces are provided on the peripheral surface at the transition to sections, that are angled with respect to one another, of the peripheral surface, and wherein the position of the cutting edges defines a quadrilateral in the plan view of the main surfaces. Fixing with more favorable leverages and permanently more precise positioning of the cutting edges are provided by the quadrilateral having in each case two short and two long sides and cutting edges oriented in each case in opposite directions in the peripheral direction at adjacent corners and oriented in each case in the same direction at diagonally opposite corners of the quadrilateral.

24 Claims, 3 Drawing Sheets

Figure 1:
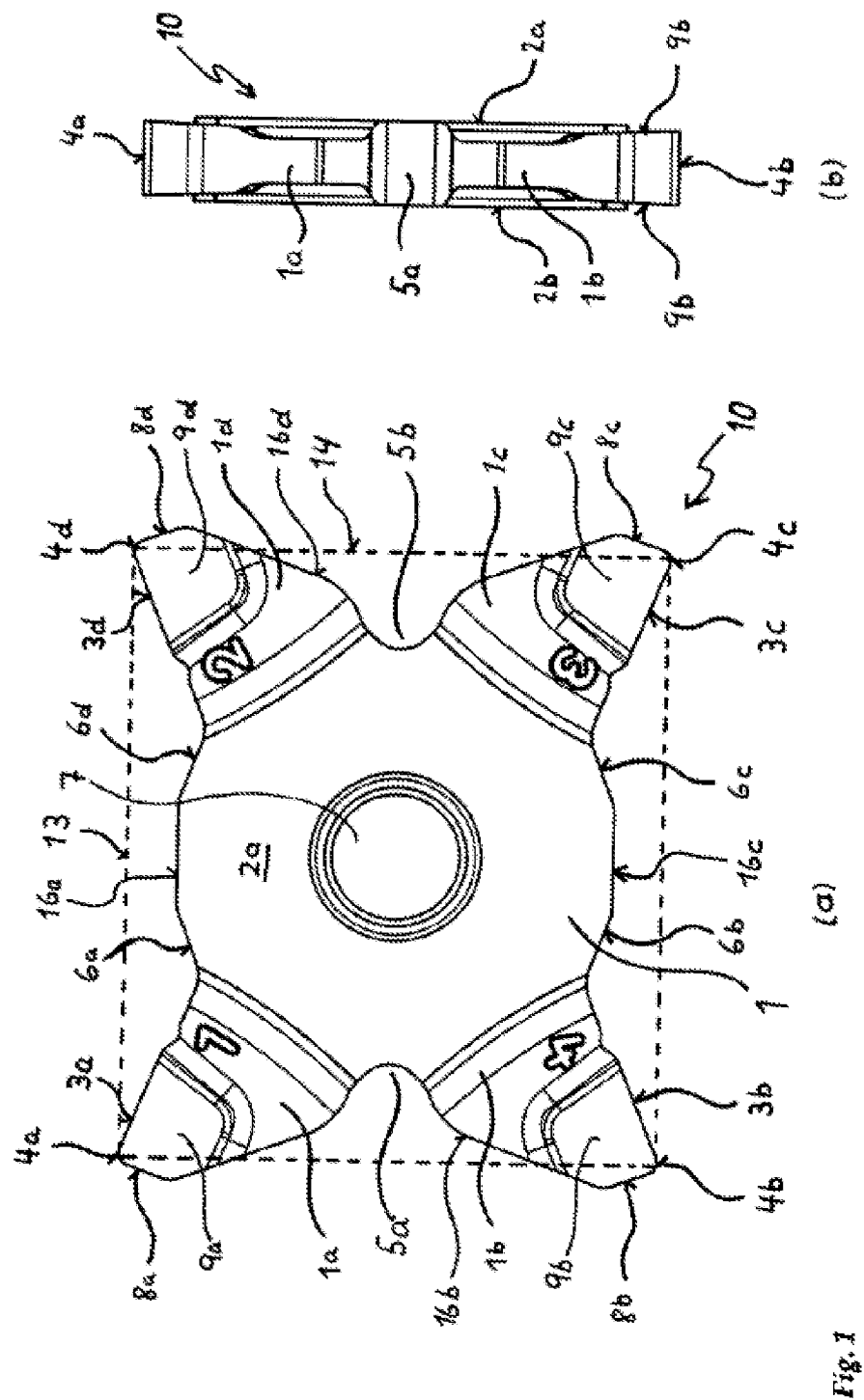

(52) U.S. Cl.
CPC ... *B23B 2200/048* (2013.01); *B23B 2200/369* (2013.01); *B23B 2200/3627* (2013.01); *B23B 2205/12* (2013.01); *B23B 2260/104* (2013.01); *Y10T 407/2274* (2015.01); *Y10T 407/23* (2015.01)

(56) References Cited

U.S. PATENT DOCUMENTS

| | | | | |
|---|---|---|---|---|
| 5,163,788 A * | 11/1992 | Dahl | ................ | B23C 5/2234 407/101 |
| 5,308,197 A * | 5/1994 | Little | ................ | 407/101 |
| 5,529,440 A * | 6/1996 | Schmidt | ................ | B23B 27/08 407/113 |
| 5,607,263 A * | 3/1997 | Nespeta | ................ | B23B 27/007 407/53 |
| 6,612,207 B2 * | 9/2003 | Schiffers | ................ | 82/1.11 |
| 7,682,109 B2 * | 3/2010 | Hecht | ................ | B23B 27/007 407/102 |
| 7,972,090 B2 * | 7/2011 | Jonsson et al. | ................ | 407/103 |
| 8,192,114 B2 * | 6/2012 | Chang | ................ | B23B 27/1622 407/103 |
| 8,403,603 B2 * | 3/2013 | Zitzlaff | ................ | B23B 27/1666 407/101 |
| 8,678,718 B2 * | 3/2014 | Hecht | ................ | 407/117 |
| 2001/0022123 A1 | 9/2001 | Schiffers | | |
| 2003/0156910 A1 * | 8/2003 | Friedman et al. | ................ | 407/117 |
| 2007/0231089 A1 * | 10/2007 | Hecht | ................ | B23B 27/04 407/113 |
| 2009/0162154 A1 * | 6/2009 | Jonsson | ................ | B23B 27/045 407/114 |
| 2013/0156516 A1 * | 6/2013 | Hecht | ................ | B23B 27/045 407/103 |

FOREIGN PATENT DOCUMENTS

| | | | |
|---|---|---|---|
| GB | 2 070 472 | | 9/1981 |
| GB | 2070472 A | * | 9/1981 |
| GB | 2078570 | | 1/1982 |
| JP | S61-10241 | | 3/1986 |
| JP | 2001-62624 | | 3/2001 |
| JP | 2003-245809 | | 9/2003 |
| JP | 2009-531186 | | 9/2009 |
| WO | 2009/082327 | | 7/2009 |
| WO | 2012/052984 | | 4/2012 |

OTHER PUBLICATIONS

German Search Report for German Application No. 10 2011 007 076.1 dated Mar. 2, 2012.
International Search Report for PCT/EP2012/055884 dated Jul. 10, 2012.
Notice of Reasons for Rejections (with English Translation) for Japanese Application No. 2014-503094, dated Sep. 1, 2015.

* cited by examiner

INDEXABLE CUTTING INSERT AND INDEXABLE CUTTING INSERT HOLDER

The present invention relates to an indexable cutting insert for grooving or parting, comprising a plate-shaped main body with two parallel main surfaces and a peripheral surface connecting the two main surfaces and comprising a plurality of sections that are angled with respect to one another, wherein four cutting edges running transversely to the main surfaces are provided on the peripheral surface at the transition of sections of the peripheral surface that are angled with respect to one another and wherein, in a plan view of the main surfaces, the position of the cutting edges defines a quadrilateral.

The present invention also relates to an indexable cutting insert holder for an indexable cutting insert of the aforementioned type, with an insert pocket and a lateral surface and has a recess adjoining the lateral surface with faces extending essentially normally to the lateral surface and angled relative to one another.

The recess can optionally receive a part or a corner of a quadrilateral indexable cutting insert of the aforementioned type, of which, when used as intended, at least one of the cutting edges is in each case inactive and can be brought into an active position by corresponding indexing or rotation or turning of the cutting insert on a corresponding holder, wherein a previously active cutting edge takes up an inactive position.

An indexable cutting insert of the type described above as well as a corresponding indexable cutting insert holder are known for example from EP 1 136 158 A1.

One problem with cutting inserts of this kind is that, among other things, only a relatively narrow portion of the indexable cutting insert, which bears a cutting edge, projects from a cutting plate holder when mounted on it in the active position, and is able to penetrate into a workpiece surface and to recess a groove with the width of the cutting edge. The cutting edge is the portion projecting farthest from the indexable cutting insert holder. In conventional indexable cutting inserts this necessarily has the result that locating surfaces and supporting surfaces, above which the indexable cutting insert is to be fixed on an indexable cutting insert holder, are positioned in such a way that above the respective active cutting edge relatively unfavourable leverage conditions act upon the cutting insert, which tend to lever the cutting insert out of its pocket or can at least cause a small change in position of the cutting insert, so that the cutting edge position also cannot be defined sufficiently accurately.

Against the background of this prior art, the object of the present invention is to provide an indexable cutting insert and an associated indexable cutting insert holder, with which fixing is possible with more favourable leverage conditions and which furthermore allow a constantly more precise positioning of the cutting edges.

With respect to the indexable cutting insert, this object is solved in that the quadrilateral has two short and two long sides and in that the cutting edges are oriented oppositely on adjacent corners of the quadrilateral in each case in the peripheral direction and at diagonally opposite corners of the quadrilateral are in each case oriented in the same sense.

For explanation, it should be pointed out that the term "short" or "long" sides only refers to the ratio of the sides defining the quadrilateral, i.e. two of the sides of the quadrilateral are at any rate shorter than the other two sides, wherein the short sides do not have to be of equal length and the two long sides need not necessarily be of equal length, even if this is ultimately preferable. Preferred ratios of long to short sides will be defined more precisely later.

Cutting edges that are "oriented oppositely in the peripheral direction" or "oriented in the same sense" means the orientation of cutting surfaces and flanks on a cutting edge in relation to the peripheral direction. Cutting edges oriented in the same sense therefore have cutting surfaces that point in the same peripheral direction (clockwise or anticlockwise), whereas oppositely oriented cutting edges accordingly have cutting surfaces which in each case point in opposite directions in the peripheral direction.

This applies similarly of course to the respective flanks. The actual peripheral surfaces of the cutting insert need not of course define a quadrilateral exactly, but the individual peripheral sections can certainly be angled relative to one another, which includes a curved form, and only the cutting edges, formed on the transition between two sections of the peripheral surface concretely between in each case a section of a long and a short peripheral side, span the quadrilateral completely in a lateral plan view, wherein however both along the long and the short side, the actual course of the peripheral surface certainly need not extend rectilinearly between adjacent cutting edges.

This configuration makes it possible for a respective active cutting edge, which in plan view is formed by a corner between a peripheral section of in each case a long and a short side, to be supported with a locating surface on the other, opposite long side and simultaneously also to be supported with a supporting element on the short side opposite the respective active cutting edge, which owing to the unequal length of the distances between the cutting edges has a correspondingly larger distance from the active cutting corner and from the (then active) locating surface of the long side, which leads to the aforementioned more favourable leverage conditions. These conditions can in particular be made even more favourable or optimized by increasing the ratio of long to short sides.

These more favourable leverage conditions lead in their turn to a more accurate, durable positioning of the respective active cutting corner.

In the preferred embodiment of the invention, it is envisaged that the cutting surfaces of adjacent cutting edges contiguous with the cutting edges are in each case turned away from the short side or short sides of the quadrilateral. Accordingly, the cutting surfaces of adjacent cutting edges in each case face a long side of the quadrilateral and so are oppositely oriented.

In the preferred embodiment of the invention, the cutting edges extend perpendicularly to the lateral main surfaces, but this is not necessarily the case, as the cutting edges can also easily extend inclined to this direction or in an arc or at an angle, but as a result extend from the one side of the cutting insert, i.e. from the one main surface, to the other side or main surface.

In the preferred embodiment, the quadrilateral defined by the cutting edges is a parallelogram with in each case two short sides of equal length and two long sides of equal length, in particular a rectangle.

Moreover, in the preferred embodiment the aspect ratio of long to short sides of the quadrilateral is at least 1.1 and at most 5. An aspect ratio of long to short sides of at least 1.2 and at most 2, preferably at most 1.5, is preferred. In a concrete embodiment the aspect ratio of long to short sides is about 1.25 to 1.3.

Compared with a conventional cutting insert, defining in plan view a square or some other regular polygon, such as would be used for the same application, two opposite sides would tend to be lengthened rather than say shortening the other two sides, because only the corresponding lengthening of two opposite sides also leads to more favourable leverage conditions than with a corresponding conventional cutting insert.

Furthermore, in one embodiment of the invention it is envisaged that the mutually opposite sections of the main surfaces, directly contiguous with a cutting edge, form front flanks, whose distance apart, starting from the cutting edge and the distance from this cutting edge, is smaller than the length of the cutting edge measured normally to the main surfaces. In grooving and parting, this ensures that the relevant front flanks do not come in contact with the walls of a groove produced by the cutting edge, but are at a small distance from them.

As the indexable cutting insert is intended primarily for grooving and parting, thus on a rotating workpiece grooves are cut into the peripheral surface or a section of the workpiece is cut off (by cutting the groove all the way to the centre of the workpiece), the corresponding indexable cutting insert is generally relatively thin, i.e. even the short sides of the quadrilateral defined by the cutting edges are still relatively long compared to the thickness of the cutting insert. In the preferred embodiment, the ratio of the short sides of the quadrilateral to the thickness of the indexable cutting insert is at least 2 and at most 15, preferably at least 3 and at most 10. In a concrete embodiment example the ratio of the short sides to the (maximum) thickness of the indexable cutting insert is about 6 to 7.

Although it is ultimately only the thickness of the sections of the indexable cutting insert contiguous with the cutting edge, which optionally must penetrate into the groove produced in a workpiece by the cutting edge and must therefore have a corresponding small thickness, that is important, the rest of the indexable cutting insert, which is received in a corresponding recess of an indexable cutting insert holder, will also generally, for reasons of economy of material, not be made excessively thick and is therefore often only slightly thicker than the cutting edge is long, measured in this direction. The indexable cutting insert can of course also overall have a maximum thickness that is smaller than the cutting edge is long, measured in the direction of this thickness. An embodiment of the invention is preferred in which the short sides have a positioning notch. A "positioning notch" is to be understood as a hollow or a recess in the short side, which permits the engagement of a corresponding supporting or positioning element on an indexable cutting insert holder and, together with the active cutting edge and a locating surface on the long side, defines a corresponding lever and stop points determining the position of the indexable cutting insert.

In another embodiment of the present invention, two locating surfaces arranged at a distance from the respective nearest cutting edge as well as at a distance from one another are provided on the sections of the peripheral surface extending along the long sides of the quadrilateral. The two locating surfaces are therefore positioned in each case somewhere in the region between a cutting edge and the mid-point of the long side.

In another embodiment, it is envisaged that the main surfaces have a central, locating through-hole. This makes additional securing of the cutting insert possible by means of a corresponding screw, which is passed through the locating hole and is screwed into a corresponding thread in the fixing hole of an indexable cutting insert holder. This contributes additionally to more precise positioning and fixing of the indexable cutting insert and its active cutting edge.

Finally, according to one embodiment of the invention it is envisaged that the indexable cutting insert comprises a central main part with a first plate thickness and the central locating hole, and of four corner sections of smaller thickness, on which the cutting edges, with flanks and cutting surfaces and the front flanks, are arranged.

Regarding the indexable cutting insert holder for an indexable cutting insert of the type described above, which has an insert pocket, a lateral surface and a recess adjoining the lateral surface with faces extending essentially normally to the lateral surface and angled relative to one another, the object to be achieved by the invention is achieved in that on one of the faces a stop surface is provided, which is spaced from the corner defined by the point of intersection of the angled faces, whereas a supporting element with convex, round or polygonal cross-section is provided on the second face, also at a distance from the corner.

In their turn, the angled faces need not extend in a straight line and the point of intersection between these faces can also be an imaginary point of intersection through an imaginary extension of an averaged course of these faces. The meaning of the feature described above is that the stop surface should be located as close as possible to the free edge of the recess beneath an active cutting edge and at a distance from the supporting element, but without making contact with a (non-active) cutting edge or cutting surface. The corner defined above is a large distance away from this free edge of the recess and therefore the stop surface is also a large distance away from this corner, without the exact dimensions and the exact position of the corner or of the stop surface being important.

An indexable cutting insert holder of this kind makes it possible for an indexable cutting insert of the type described above to be placed with one of its main surfaces on the lateral surface of the recess, whereas a cutting edge or cutting corner diagonally opposite the respective active cutting edge between the faces of the receiving space, projects into the latter. Preferably, both the long and the short sides of the indexable cutting inserts are generally convex, apart from minor variations, i.e. they are, compared to a direct rectilinear connection of the cutting edges, at least in the middle somewhat retracted and in their corner regions thus define almost triangular bodies, which project into the corresponding receiving space delimited by two faces forming a V. The receiving space and the lateral surface of the indexable cutting insert holder can in this case be configured so that even the whole main part and part of two further cutting corners are accommodated in the receiving space, but with one cutting corner in any case projecting beyond the lateral surface and out of the receiving space. This is the active cutting edge or cutting corner in each case. "Cutting corner" means in this case the corner region comprising the cutting edge that can be seen in the lateral plan view of the four corners of the quadrilateral defined above, which in the assembled state (and in the side view) has an active cutting edge projecting beyond the contour of the indexable cutting insert holder.

To replace this active cutting corner with another, previously inactive cutting corner, either the cutting insert can be turned through 180° about a central axis extending perpendicularly through the main surfaces or alternatively it can in each case be turned or "reflected" through 180°, about an axis extending centrally, parallel to the long side or parallel to the short side in each case, combinations of these rotating operations also being permissible. In this way, in any case all four cutting edges can be brought successively into an active position.

In one embodiment of the present invention, the supporting element of the indexable cutting insert holder is a pin with a cylindrical surface, wherein the axis of the cylinder extends normally to the lateral surface. Such a cylinder can be positioned and dimensioned in such a way that it engages in the positioning notch of the short side of the indexable cutting insert and therefore positions the latter unequivocally, at any rate in conjunction with another locating surface. The pin could, however, also have a polygonal cross-section.

Furthermore, in one embodiment of the invention, the indexable cutting insert holder has a fixing hole that passes through the lateral surface, wherein the distance from the point of the stop surface farthest from the supporting element to the nearest point of the supporting element is greater than the distance of the same points in each case from the centre of the fixing hole. The supporting element, the axis of the fixing hole and the stop surface thus form a triangle, the longest side of which extends between the supporting element and the stop surface. Also, in the case of the fixing hole, the faces of the receiving space need not necessarily be rectilinear, but can comprise several, mutually angled face sections, one of which, however, forms the aforementioned stop surface, whereas on the other face two sections form a projecting corner, on which the supporting element is arranged.

The invention finally also relates to a combination of an indexable cutting insert according to one of claims 1 to 14, as described above, and an indexable cutting insert holder, as was described above and is defined in one of claims 15 to 18, wherein the distance from the centre of the fixing hole in the lateral surface of the indexable cutting insert holder to the stop surface and the supporting element is smaller than the distance of the centre of the locating hole from the locating surface and the positioning notch of the indexable cutting insert. This effectively means that on passing a corresponding securing screw through the locating hole of the indexable cutting insert holder and into the optionally threaded fixing hole in the lateral surface of the indexable cutting insert holder, a side flank of the respective securing screw exerts a force on the wall of the locating hole, which is directed towards the corner of the receiving space delimited as V-shaped, i.e. in the direction between supporting element and stop surface. As a result, the indexable cutting insert is pressed with its positioning notch firmly against the supporting element on the one face and with its locating surface firmly against the stop surface of the other face of the receiving space and so is located and positioned unequivocally.

The decisive advantage of the indexable cutting inserts according to the invention and of the indexable cutting insert holder is that at a given recess depth, which is defined by the length or the projection of the corner regions of the indexable cutting insert, the thickness of which is smaller than the length of the cutting edge measured normally to the main surfaces, supporting of the active cutting corner or cutting edge with relatively favourable leverage conditions is possible, so that the position of the cutting edge also remains accurately defined permanently.

Figure 2:
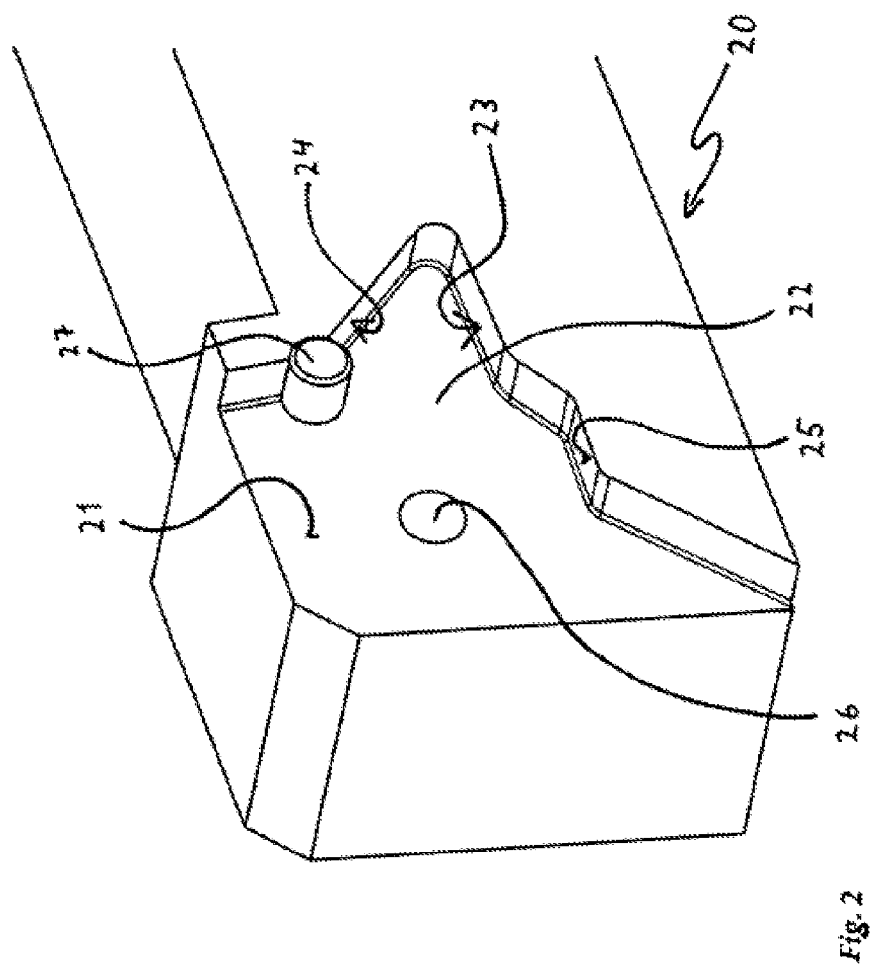
Figure 3:
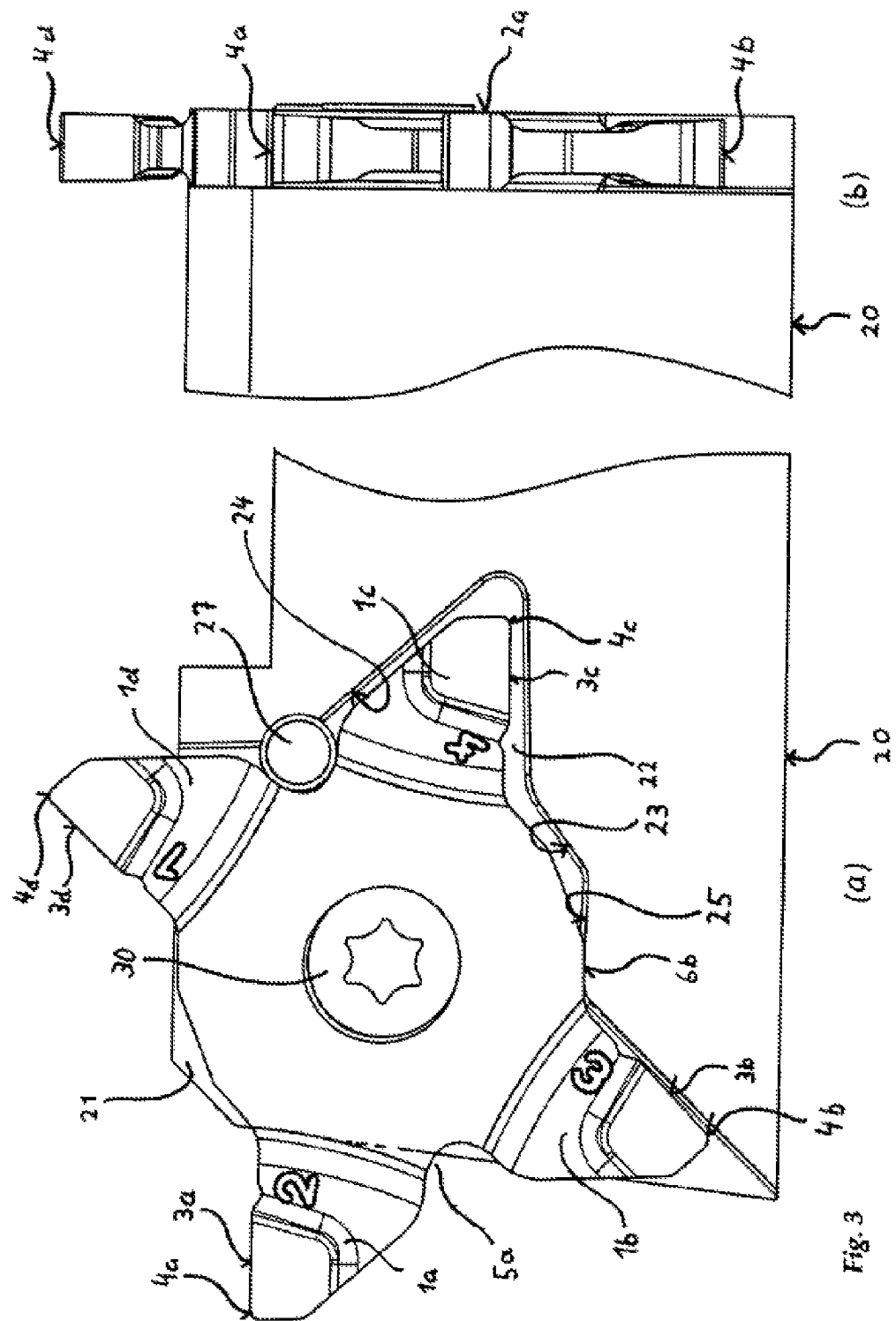

Further advantages, features and possible applications of the present invention will be clear from the following description of a preferred embodiment and the associated drawings. There are shown in:

FIG. 1 an indexable cutting insert in plan view of one of the main surfaces and a side elevation, FIG. 2 an indexable cutting insert holder without an indexable cutting insert contained therein, and FIG. 3 an indexable cutting insert according to FIG. 1 in plan view of one of the main surfaces and a side view, in each case mounted on an indexable cutting insert holder according to FIG. 2.

The indexable cutting insert has four cutting edges 4a, 4b, 4c and 4d, extending in FIG. 1(a) normally to the plane of the paper. These four cutting edges define the corners of an imaginary quadrilateral, concretely a rectangle, which is drawn with dashed lines and comprises long sides 13 and short sides 14. The actual peripheral surfaces 16a, 16b, 16c and 16d, which in each case extend between the cutting edges 4a, 4b, 4c and 4d, follow a path deviating from the rectilinear sides 13 and 14 in the form of a plurality of sections that are angled with respect to one another, which on the short sides 14 partially project convexly over the sides 14, but in the centre are concave again and have a positioning notch 5a, 5b there. The peripheral surfaces 16a and 16c, which extend along the long sides 13, are also recessed relative to the long sides 13, so that in plan view essentially triangular cutting tips 1a, 1b, 1c and 1d are formed, which project from the main part 1 of the main body towards the corners of the imaginary quadrilateral.

Moreover, the main part 1, which is octagonal in plan view and has parallel opposite flat surfaces, has a somewhat greater thickness than the four cutting tips 1a, 1b, 1c and 1d attached on opposing sides of the main part 1, said tips having a thickness somewhat less than the length of the cutting edges 4a, 4b, 4c and 4d measured normally to the main surfaces 2a, 2b. However, the thickness of the main part 1 can also be less than the length of the cutting edges 4 measured in this thickness direction as well as of equal thickness or thinner than the cutting tips 1a,b,c,d. The cutting tips each have a cutting surface 3a,b,c,d, a flank 8a,b,c,d, a cutting edge 4a,b,c,d formed at the transition of these two surfaces, and front flanks 9a,b,c,d.

The clear distance of the respective cutting edge 4 from the main part 1 therefore determines the maximum depth of penetration of the cutting tips 1a,b,c,d into a workpiece, wherein the indexable cutting insert holder also is configured so that essentially only the active cutting tip projects above the lateral surface 21 or the outline of the indexable cutting insert holder 20.

FIG. 1(b) shows a view of the indexable cutting insert 10 of FIG. 1 (a) from the left. Once again we can see the two cutting edges 4a and 4b, of which in the installed state in each case only one cutting edge is active. The other two cutting edges 4c and 4d are turned away from the observer, and the cutting edge 4b from the flank can still be seen on the lower edge of the cutting plate 10 in FIG. 1 (a).

The indexable cutting insert holder 20 is shown in FIG. 2. As can be seen, the indexable cutting insert holder 20 according to FIG. 2 has an insert pocket, which is defined by a lateral surface 21 and faces 23, 24 extending normally to the lateral surface 21, forming a receiving space 22 for an approximately V-shaped or triangular body. The faces 23, 24 each comprise a plurality of sections that are angled relative to one another, but define overall essentially a V-shape or triangular shape. On the upper face 24, which is defined by two angled sections, which have in common a projecting corner, a cylindrical pin 27 is provided in the region of this corner, forming a supporting element which, as can be seen in FIG. 3 (a), in the assembled state of an indexable cutting insert, engages in a positioning notch 5a or 5b.

The face 23 has, at a distance from the corner, which is defined by the general V-shape of the two faces 23, 24, a stop surface 25, on which an indexable cutting insert can be supported with its corresponding locating surface 6a, 6b, 6c or 6d.

Moreover, also in the lateral surface 21, a fixing hole 26 can be seen, which is configured as a threaded hole. The insert pocket and the indexable cutting insert are dimensioned so that essentially the main part 1 and two or three adjacent cutting corners of a mounted indexable cutting insert 10 are accommodated in the receiving space 22 extending next to the lateral surface 21, while in any case the fourth, active cutting corner projects from the receiving space.

In FIG. 3 the indexable cutting insert 10 is shown mounted on the indexable cutting insert holder 20. The indexable cutting insert 10 is mainly accommodated in the receiving space 22 of the indexable cutting insert holder 20, with the cutting corner or cutting tip 1a projecting from the indexable cutting insert holder. The whole section of the indexable cutting insert 10 projecting beyond the outline, indicated with dashed lines, of the indexable cutting insert holder 20 or of the lateral surface 21 and delimited by two parallel curved lines is called the "cutting corner" or "cutting tip 1a". The cutting tip 1d also projects partially beyond the upper edge of the indexable cutting insert holder 20, but is nevertheless in an inactive position in FIGS. 3 (a) and (b). The supporting element or the positioning pin 27 engages in the positioning notch 5b, which has a convex, curved form with a varying radius, which is somewhat smaller in the centre of the positioning notch 5a,b than the radius of the pin 27 and becomes larger outside of the centre, so that the pin 27 essentially rests along two linear regions on the surface of the positioning notch. Simultaneously, the locating surface 6b abuts the stop surface 25 of face 23. The faces 23, 24 are arranged and dimensioned so that they are not in contact with the cutting edges 4b and 4c accommodated in the insert pocket and the adjoining cutting surfaces and flanks. The indexable cutting insert 10 is exclusively fixed and positioned unequivocally by the central securing screw 30, the locating surface 6b abutting the stop surface 25 and pin 27 located in the positioning notch 5b. Also, with the loads acting on the cutting edge 4a, very reliable and firm fixing and positioning of the cutting edge 4a is obtained.

For the purposes of the original disclosure, it is pointed out that all features that become clear to a person skilled in the art from the present description, the drawings and the dependent claims, even if they were only described concretely in connection with certain other features, can be combined both individually and in any combinations with other of the features or groups of features disclosed here, provided this was not expressly excluded or technical circumstances make such combinations impossible or meaningless. Comprehensive, explicit presentation of all conceivable combinations of features and emphasis on the independence of the individual features on one another is omitted here only for the sake of brevity and readability of the description.

The invention claimed is:

1. Indexable cutting insert for grooving or parting, comprising a plate-shaped main body with two parallel main surfaces and a peripheral surface joining the two main surfaces and comprising a plurality of sections that are angled with respect to one another,
    wherein four cutting edges extending transversely to the main surfaces are provided on a peripheral surface on the transition of sections of the peripheral surface that are angled with respect to one another,
    wherein in plan view of the main surfaces, the position of the cutting edges defines an imaginary quadrilateral,
    wherein the imaginary quadrilateral has two short and two long sides,
    wherein the cutting edges are oriented in each case, oppositely on adjacent corners of the imaginary quadrilateral in a peripheral direction and oriented in the same direction on diagonally opposite corners of the imaginary quadrilateral,
    wherein sections extending along the shorter sides of the peripheral surface of the imaginary quadrilateral comprise a positioning notch that includes a concave-shaped portion with a radius, wherein the radius is smaller in a center of the positioning notch than a radius of a pin provided for engaging with the positioning notch, and
    wherein cutting surfaces of cutting edges are oriented to face the adjacent long side of the imaginary quadrilateral and to turn away from the adjacent short side of the imaginary quadrilateral.

2. Indexable cutting insert according to claim 1, wherein the cutting edges extend essentially normally to the main surfaces.

3. Indexable cutting insert according to claim 1, wherein the cutting edges are curved at least in sections or are at an angle to the main surfaces.

4. Indexable cutting insert according to claim 1, wherein the imaginary quadrilateral is a parallelogram.

5. Indexable cutting insert according to claim 4, wherein the imaginary quadrilateral is a rectangle.

6. Indexable cutting insert according to claim 1, wherein the aspect ratio of long to short sides of the imaginary quadrilateral is at least 1.1 and at most 5.

7. Indexable cutting insert according to claim 1, wherein the aspect ratio of long to short sides of the imaginary quadrilateral is at least 1.2 and at most 2.

8. Indexable cutting insert according to claim 7, wherein the aspect ratio of long to short sides of the imaginary quadrilateral is at most 1.5.

9. Indexable cutting insert according to claim 1, wherein the ratio of the short sides of the imaginary quadrilateral to the thickness of the indexable cutting insert is at least 2 and at most 15.

10. Indexable cutting insert according to claim 9, wherein the ratio of the short sides of the imaginary quadrilateral to the thickness of the indexable cutting insert is at least 3 and at most 10.

11. Indexable cutting insert according to claim 1, wherein the sections of the peripheral surface extending along the long sides have two locating surfaces arranged at a distance from the nearest cutting edges and at a distance from one another.

12. Indexable cutting insert according to claim 1, wherein the sections of the main surfaces opposite one another, and immediately adjoining a cutting edge, form front flanks, whose distance from one another, starting from the cutting edge and at a distance from it, is smaller than the length of the cutting edge measured normally to the main surfaces.

13. Indexable cutting insert according to claim 1, wherein the main surfaces have a central, locating through-hole.

14. Indexable cutting insert according to claim 13, wherein the indexable cutting insert comprises a central main part with a first plate thickness and the central locating hole, and four cutting tips of smaller thickness, on which the cutting edges with flanks and cutting surfaces are arranged.

15. Indexable cutting insert according to claim 13, wherein the indexable cutting insert comprises a central main part with a first plate thickness and the central locating hole, and four cutting tips with cutting edges, wherein the main part has a smaller thickness than the cutting tips.

16. Indexable cutting insert holder for an indexable cutting insert according to claim 1, including an insert pocket, which has a lateral surface and a recess adjoining the lateral surface with faces extending essentially normally to the lateral surface and angled relative to one another, wherein on one of the faces, a stop surface is provided, which is spaced from a corner defined by an imaginary point of intersection of the angled faces, and wherein the pin is provided on a second face, also at a distance from the corner.

17. Indexable cutting insert holder according to claim 16, wherein the pin has a cylindrical surface.

18. Indexable cutting insert holder according to claim 16, wherein a fixing hole passes through the lateral surface and wherein a distance from a point of the stop surface that is farthest from the supporting element to a nearest point of the supporting element is greater than a distance from the same points to a center of the fixing hole.

19. Indexable cutting insert holder according to claim 16, wherein each of the faces of the recess has a plurality of mutually angled sections, one of which forms the stop surface, and wherein on an other face two sections form a projecting corner, on which the supporting element is arranged.

20. Indexable cutting insert according to claim 1, wherein the sections extending along the shorter sides of the peripheral surface further comprise a flank of a first cutting tip and a flank of a second cutting tip and each of the flanks have a portion that projects over the shorter side of the imaginary quadrilateral that has a convex shape relative to the shorter side of the imaginary quadrilateral.

21. Indexable cutting insert according to claim 20, wherein the positioning notch is located between the flank of the first cutting tip and the flank of the second cutting tip.

22. Combination comprising:
an indexable cutting insert for grooving or parting,
the indexable cutting insert including a plate-shaped main body with two parallel main surfaces and a peripheral surface joining the two main surfaces and comprising a plurality of sections that are angled with respect to one another, wherein four cutting edges extending transversely to the main surfaces are provided on a peripheral surface on the transition of sections of the peripheral surface that are angled with respect to one another,
wherein in plan view of the main surfaces, the position of the cutting edges defines an imaginary quadrilateral,
wherein the imaginary quadrilateral has two short and two long sides,
wherein the cutting edges are oriented in each case, oppositely on adjacent corners of the imaginary quadrilateral in a peripheral direction and oriented in the same direction on diagonally opposite corners of the imaginary quadrilateral,
wherein sections extending along the shorter sides of the peripheral surface of the imaginary quadrilateral comprise a positioning notch that includes a concave-shaped portion with a radius, and
wherein cutting surfaces of cutting edges are oriented to face the adjacent long side of the imaginary quadrilateral and to turn away from the adjacent short side of the imaginary quadrilateral; and
an indexable cutting insert holder,
the indexable cutting insert holder including an insert pocket, which has a lateral surface and a recess adjoining the lateral surface with faces extending essentially normally to the lateral surface and angled relative to one another,
wherein on one of the faces, a stop surface is provided, which is spaced from a corner defined by an imaginary point of intersection of the angled faces, whereas a supporting element with convex, round or polygonal cross-section is provided on a second face, also at a distance from the corner, and
wherein a distance from a center of a fixing hole in the lateral surface of the indexable cutting insert holder to the stop surface and to the supporting element is smaller than a distance from a center of a locating hole to a locating surface of the indexable cutting insert and to the positioning notch,
wherein the positioning notch of the indexable cutting insert engages with the supporting element of the indexable cutting insert holder, and
wherein the radius of the positioning notch is smaller in a center of the positioning notch than a corresponding portion of the supporting element and the radius of the positioning notch is larger outside of said center of the positioning notch than the corresponding portion of the supporting element.

23. The combination of claim 22, wherein the supporting element is a pin and the radius of the positioning notch is smaller in the center of the positioning notch than a radius of the pin and the radius of the positioning notch is larger outside of said center of the positioning notch than the radius of the pin.

24. The combination of claim 23, wherein a surface of the positioning notch includes a plurality of linear shaped regions and a surface of the pin contacts the linear shaped regions on the surface of the positioning notch.

* * * * *